(12) United States Patent
Yoshida et al.

(10) Patent No.: US 11,808,174 B2
(45) Date of Patent: Nov. 7, 2023

(54) TURBINE AND TURBOCHARGER INCLUDING THE TURBINE

(71) Applicant: MITSUBISHI HEAVY INDUSTRIES ENGINE & TURBOCHARGER, LTD., Sagamihara (JP)

(72) Inventors: Toyotaka Yoshida, Tokyo (JP); Makoto Ozaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/907,798

(22) PCT Filed: Apr. 23, 2020

(86) PCT No.: PCT/JP2020/017443
§ 371 (c)(1),
(2) Date: Aug. 29, 2022

(87) PCT Pub. No.: WO2021/214928
PCT Pub. Date: Oct. 28, 2021

(65) Prior Publication Data
US 2023/0099007 A1    Mar. 30, 2023

(51) Int. Cl.
*F01D 9/04* (2006.01)
(52) U.S. Cl.
CPC ............ *F01D 9/04* (2013.01); *F05D 2220/40* (2013.01); *F05D 2240/127* (2013.01)
(58) Field of Classification Search
CPC . F01D 9/04; F01D 5/143; F01D 5/145; F05D 2220/40; F05D 2240/127;
(Continued)

(56) References Cited

U.S. PATENT DOCUMENTS

| 7,794,213 | B2 * | 9/2010 | Gaude | ................ F02M 35/1272 |
| | | | | 138/30 |
| 2004/0071550 | A1 * | 4/2004 | Martin | .................... F01D 9/026 |
| | | | | 415/205 |

(Continued)

FOREIGN PATENT DOCUMENTS

| EP | 1 563 168 B1 | 3/2014 |
| JP | 6-76623 U | 10/1994 |

(Continued)

OTHER PUBLICATIONS

International Preliminary Report on Patentability and English translation of the Written Opinion of the International Searching Authority for International Application No. PCT/JP2020/017443, dated Nov. 3, 2022.

(Continued)

*Primary Examiner* — Mickey H France
*Assistant Examiner* — Dapinder Singh
(74) *Attorney, Agent, or Firm* — Birch, Stewart, Kolasch & Birch, LLP

(57) ABSTRACT

A turbine includes: a rotatable impeller with a hub provided with a plurality of rotor blades; and a tubular member in which a diffuser located downstream of the impeller is formed. On an inner surface of the tubular member, a plurality of projections projecting radially inward of the tubular member are formed at positions closer to an inlet end of the tubular member than an outlet end of the tubular member. The plurality of projections are arranged in a circumferential direction of the inner surface so as to leave a space between adjacent projections.

7 Claims, 9 Drawing Sheets

(58) Field of Classification Search
CPC ......... F05D 2240/303; F05D 2240/304; F05D 2250/611; F05D 2250/70; F05D 2250/90; Y02T 10/12
See application file for complete search history.

(56) References Cited

U.S. PATENT DOCUMENTS

2017/0260861 A1* 9/2017 Yoshida .................... F01D 5/04
2018/0010464 A1* 1/2018 Yokoyama .............. F01D 17/14

FOREIGN PATENT DOCUMENTS

| JP | 9-264106 A | 10/1997 |
| JP | 2007-528955 A | 10/2007 |
| JP | 2012-177357 A | 9/2012 |
| JP | 2017-2910 A | 1/2017 |
| JP | 2018-141399 A | 9/2018 |
| WO | WO 2004/033858 A1 | 4/2004 |

OTHER PUBLICATIONS

International Search Report for International Application No. PCT/JP2020/017443, dated Jul. 21, 2020.
German Office Action dated Apr. 30, 2023 for Application No. 11 2020 006 423.9.

* cited by examiner

TURBINE AND TURBOCHARGER INCLUDING THE TURBINE

TECHNICAL FIELD

The present disclosure relates to a turbine and a turbocharger including the turbine.

BACKGROUND

Since a turbocharger installed in an automobile operates in a wide range from a low speed (low flow rate) to a high speed (high flow rate), performance improvement at each operating point is required. For example, in Patent Documents 1 and 2, a stator vane is disposed on a shroud side downstream of a turbine rotor blade to control a flow on the shroud side, thereby improving efficiency of a turbine.

CITATION LIST

Patent Literature

Patent Document 1: JPH9-264106A
Patent Document 2: JP2012-177357A

SUMMARY

Technical Problem

However, if a stator vane is disposed downstream of a turbine rotor blade, although it is possible to certainly improve efficiency of a turbine at one operating point, a loss may occur at another operating point. In addition, disposing such stator vane may lead to deterioration in productivity or cost. Meanwhile, on a high flow rate side, performance of a diffuser composing the turbine is greatly related to performance of the turbine, and thus a shape of the diffuser is required which can improve performance of the turbine rotor blade, based on characteristics of each operating point.

In view of the above, an object of at least one embodiment of the present disclosure is to provide a turbine and a turbocharger including the turbine with improved performance.

Solution to Problem

In order to achieve the above object, a turbine according to the present disclosure includes: a rotatable impeller with a hub provided with a plurality of rotor blades; and a tubular member in which a diffuser located downstream of the impeller is formed. On an inner surface of the tubular member, a plurality of projections projecting radially inward of the tubular member are formed at positions closer to an inlet end of the tubular member than an outlet end of the tubular member. The plurality of projections are arranged in a circumferential direction of the inner surface so as to leave a space between adjacent projections.

Advantageous Effects

Since a fluid having passed through the rotor blade usually includes a swirling flow, a fluid flow moves toward a shroud side, and a backflow vortex is generated radially inward thereof. By contrast, with the turbine of the present disclosure, since the plurality of projections projecting radially inward of the tubular member are formed, flow separation is caused between the adjacent projections, and with the separation, the fluid flow close to the shroud side shifts radially inward as a whole. By being attracted to such fluid flow in the diffuser, of the flow between the adjacent rotor blades, a flow near the center in a spanwise direction of the rotor blade increases in flow velocity. Then, the flow velocity difference of a fluid between the inlet and the outlet of the rotor blade increases, that is, the static pressure difference between the inlet and the outlet of the rotor blade increases, and the torque applied to the blade surface of the rotor blade increases, making it possible to improve performance of the turbine.

DETAILED DESCRIPTION

Hereinafter, a turbine according to the embodiments of the present disclosure will be described with reference to the drawings. The embodiments each indicate one aspect of the present disclosure, do not intend to limit the disclosure, and can optionally be modified within a range of a technical idea of the present disclosure.

Configuration of Turbocharger According to Embodiment of Present Disclosure

Figure 1:
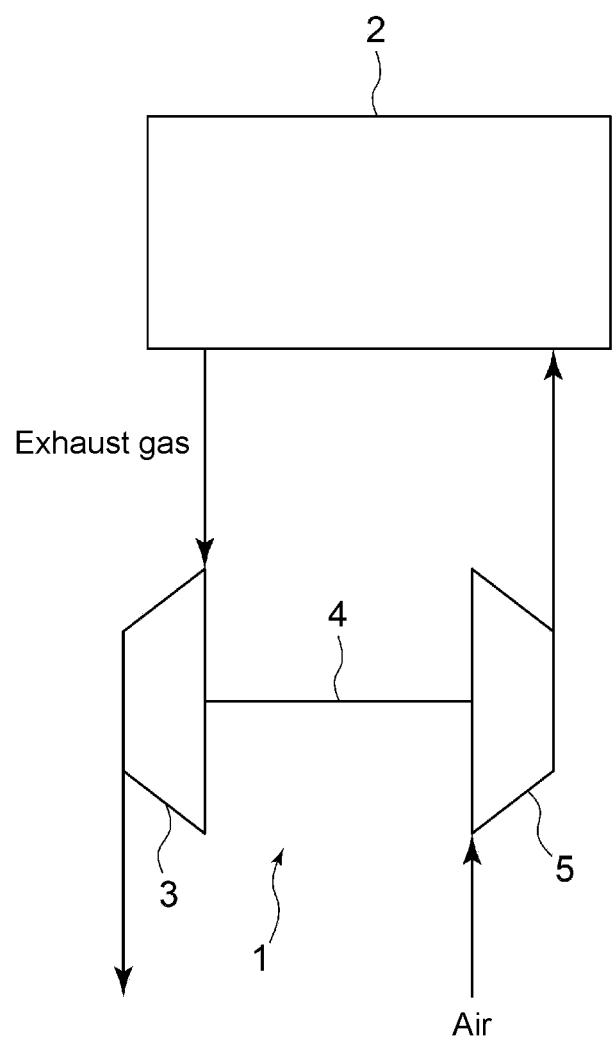
FIG. 1 is a schematic view showing the configuration of a turbocharger according to an embodiment of the present disclosure.

As shown in FIG. 1, a turbocharger 1 according to an embodiment of the present disclosure includes a turbine 3 which is driven by an exhaust gas discharged from an internal combustion engine 2, and a compressor 5 which is driven by transmission of a rotation of the turbine 3 via a drive shaft 4. The compressor 5 compresses air, and the compressed air is supplied to the internal combustion engine 2.

Configuration of Turbine According to Embodiment of Present Disclosure

Figure 2:
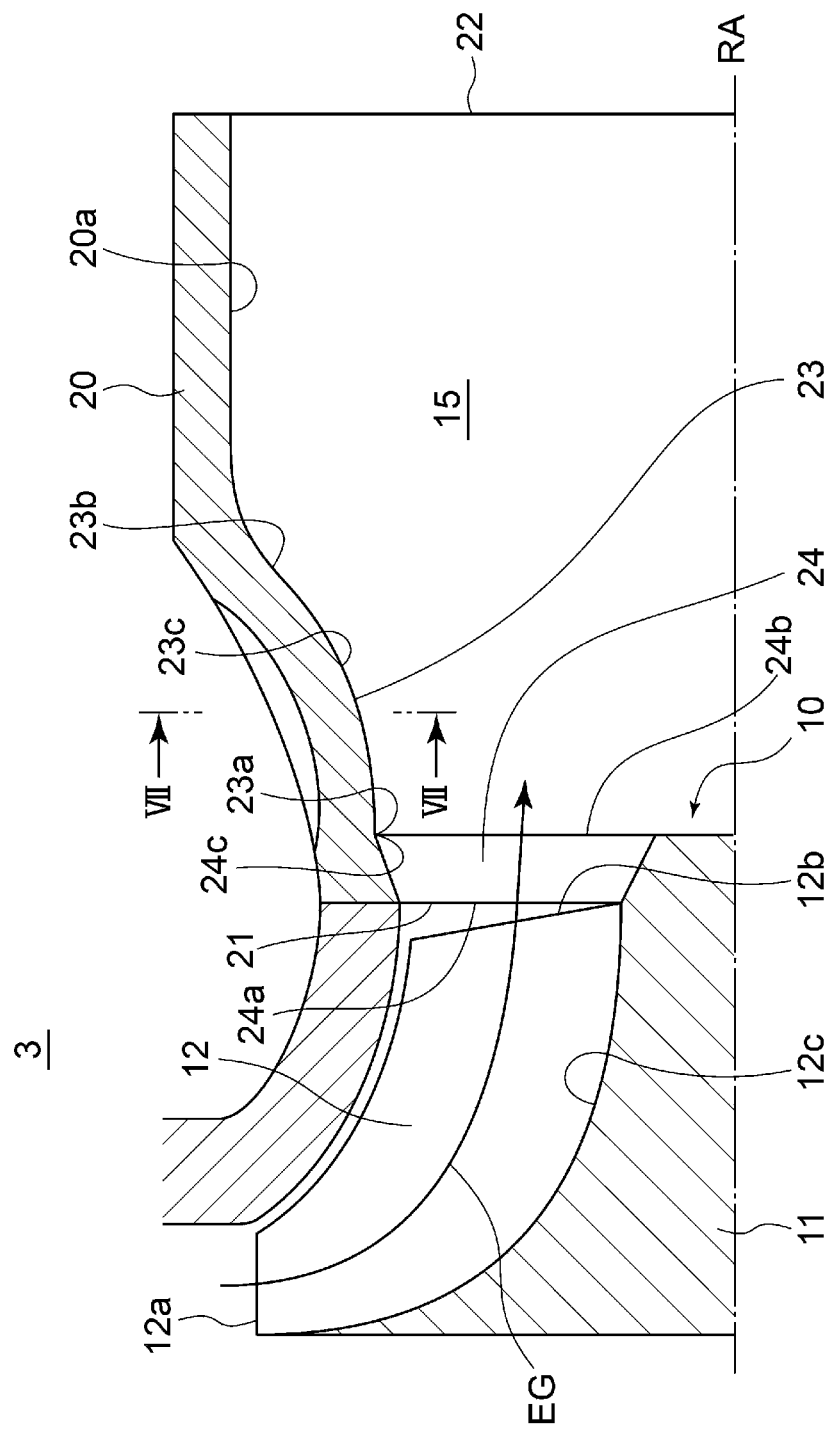
FIG. 2 is a schematic cross-sectional view of a turbine according to an embodiment of the present disclosure.

As shown in FIG. 2, the turbine 3 includes a rotatable impeller 10, and a tubular member 20 in which a diffuser 15 located downstream of the impeller 10 is formed in an exhaust gas flow EG direction in the turbine 3. The impeller 10 includes a hub 11 and a plurality of rotor blades 12 (only one rotor blade is depicted in FIG. 2) disposed in the hub 11.

Figure 3:
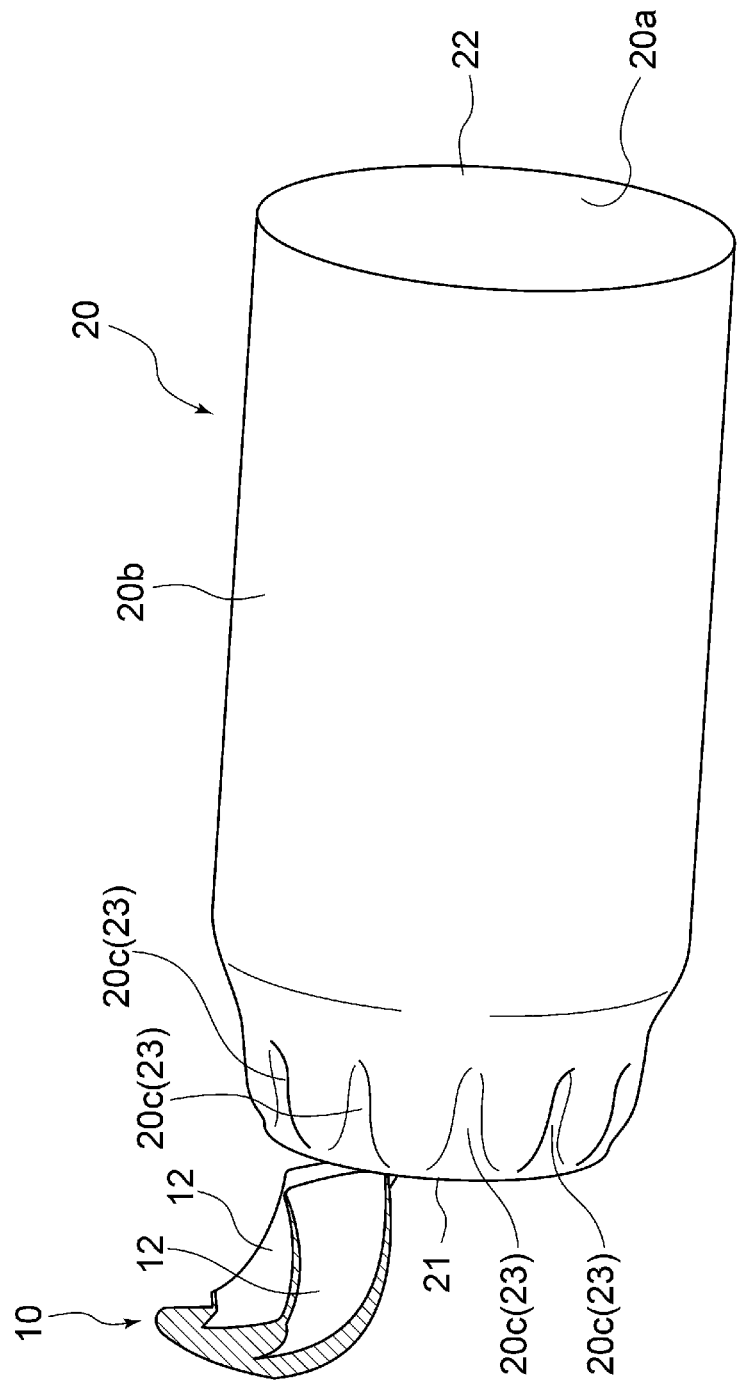
FIG. 3 is a perspective view showing a tubular member of the turbine according to an embodiment of the present disclosure.

The tubular member 20 includes an inlet end 21 and an outlet end 22. On an inner surface 20a of the tubular member 20, a plurality of projections 23 projecting radially inward of the tubular member 20 are formed at positions closer to the inlet end 21 than the outlet end 22, preferably in the vicinity of the inlet end 21. As shown in FIG. 3, portions 20c in which an outer surface 20b is recessed in the vicinity of the inlet end 21 of the tubular member 20, respectively, correspond to the projections 23 formed on the inner surface 20a, and the plurality of projections 23 are arranged in the circumferential direction of the inner surface 20a so as to leave a space between the adjacent projections 23 and 23.

Figure 4:
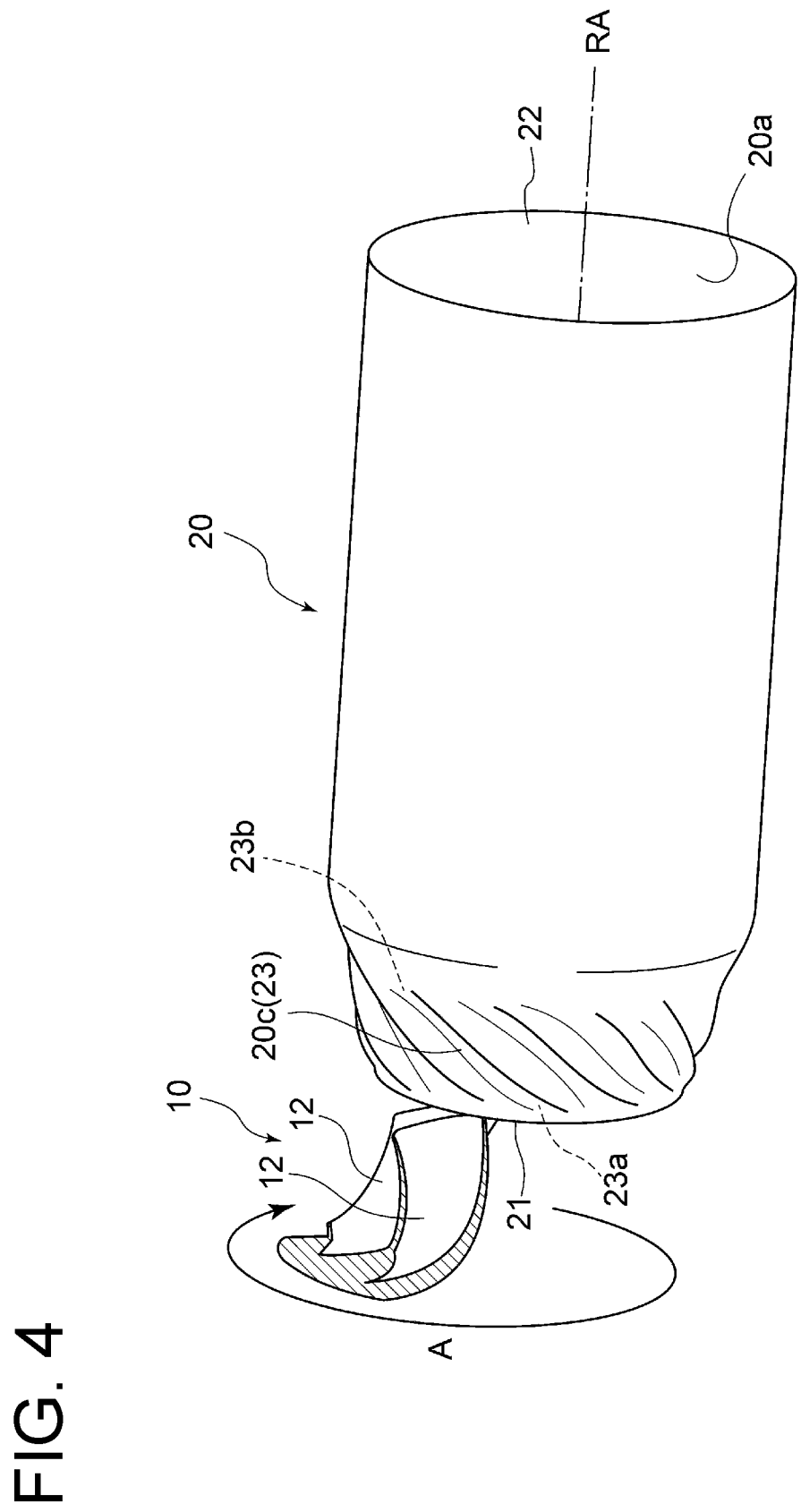
FIG. 4 is a perspective view showing a modified example of the tubular member of the turbine according to an embodiment of the present disclosure.

As shown in FIG. 2, the projection 23 includes a first end 23a on the inlet end 21 side and a second end 23b on the outlet end 22 side, and has a shape extending from the first end 23a to the second end 23b. The projection 23 is configured such that the first end 23a and the second end 23b are at the same position in the circumferential direction of the inner surface 20a. However, the present disclosure is not limited to this form, and for example, as shown in FIG. 4, the projection 23 may be configured such that the second end 23b is located on a rotational direction A side of the impeller 10 (see FIG. 2) relative to the first end 23a. Although not shown, contrary thereto, the projection 23 may be configured such that the first end 23a is located on the rotational direction A side of the impeller 10 relative to the second end 23b in the circumferential direction of the inner surface 20a.

As shown in FIG. 2, the tubular member 20 may include a tapered portion 24 whose inner diameter increases from the inlet end 21 toward the outlet end 22, between the inlet end 21 and the plurality of projections 23. In the configuration where the tubular member 20 includes the tapered portion 24, the projection 23 is preferably configured such that a surface 23c of the projection 23 is located at the same position as an inner surface 24c at an outlet 24b of the tapered portion 24 or located on the outer side of the inner surface 24c at the outlet 24b of the tapered portion 24 in the radial direction of the tubular member 20.

Figure 5:
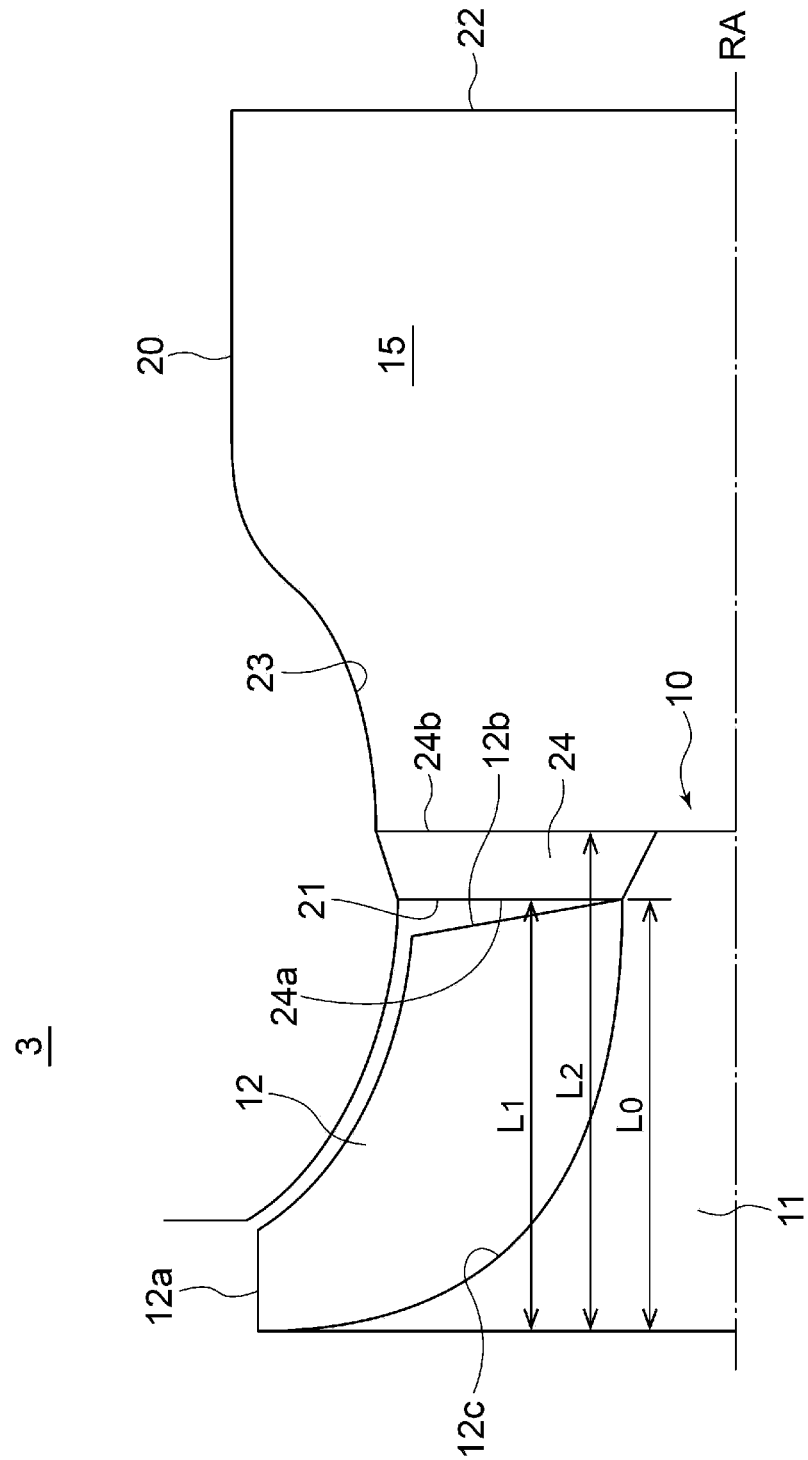
FIG. 5 is a schematic cross-sectional view of the turbine according to an embodiment of the present disclosure.

As shown in FIG. 5, in the configuration where the tubular member 20 includes the tapered portion 24, it is preferable that $L_0 \leq L_1 \leq 1.1 L_0$ and $1.1 L_1 \leq L_2 \leq 1.5 L_1$ are satisfied, where $L_0$ is a distance from a leading edge 12a to a trailing edge 12b of the rotor blade 12 in a rotational axis RA direction of the impeller 10 on a hub-side edge 12c at which the rotor blade 12 is connected to the hub 11, and $L_1$ and $L_2$ are distances from the leading edge 12a to the inlet 24a and the outlet 24b of the tapered portion 24, respectively, in the rotational axis RA direction on the hub-side edge 12c of each of the plurality of rotor blades 12.

Operation of Turbine According to Embodiment of Present Disclosure

As shown in FIG. 1, if the exhaust gas discharged from the internal combustion engine 2 flows into the turbine 3, as shown in FIG. 2, the exhaust gas flow EG is increased in flow velocity when flowing between the adjacent rotor blades 12 and flows into the diffuser 15. Torque applied to a blade surface of the rotor blade 12 is generated by such flow velocity difference of the exhaust gas flow EG at each of the inlet and the outlet of the rotor blade 12, that is, a static pressure difference, and the impeller 10 rotates.

Figure 6:
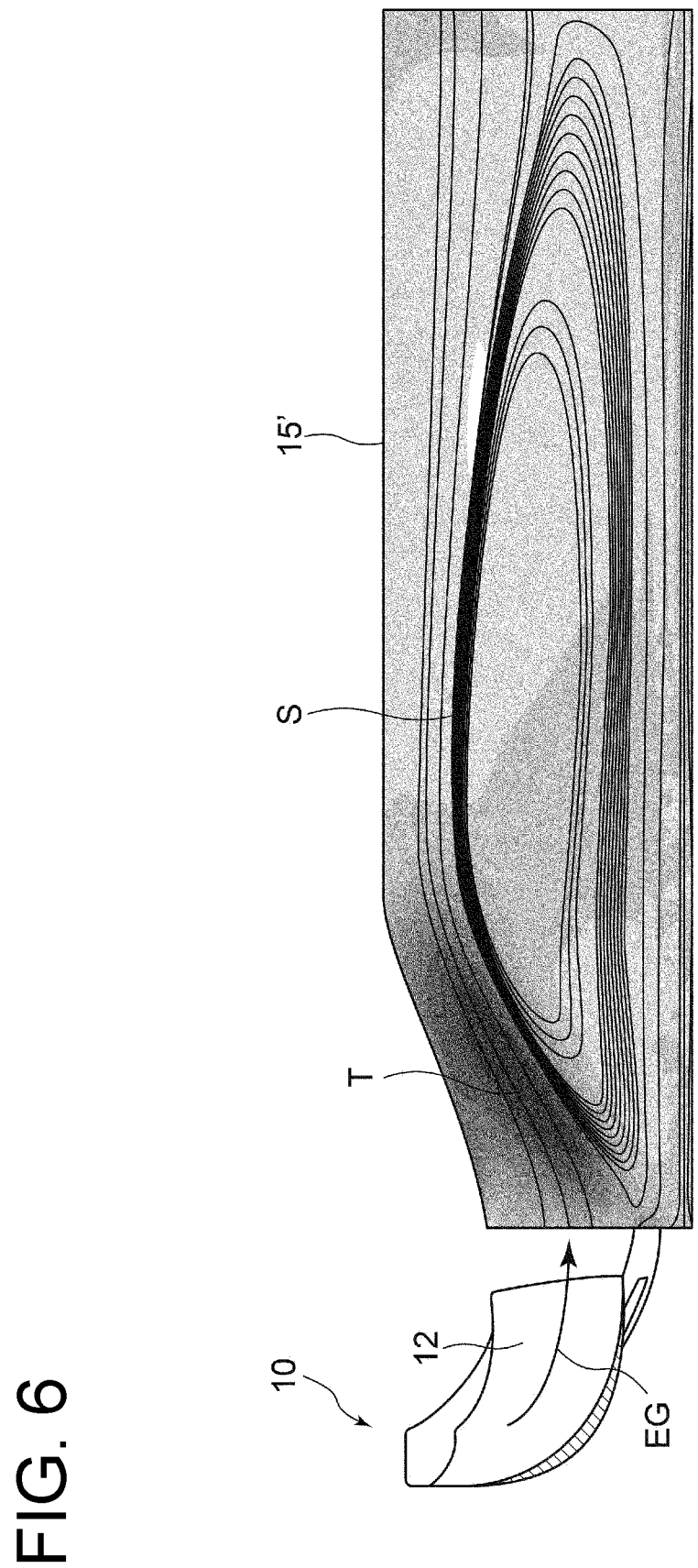
FIG. 6 is a view for describing an exhaust gas flow in a diffuser in a conventional turbine.
Figure 7:
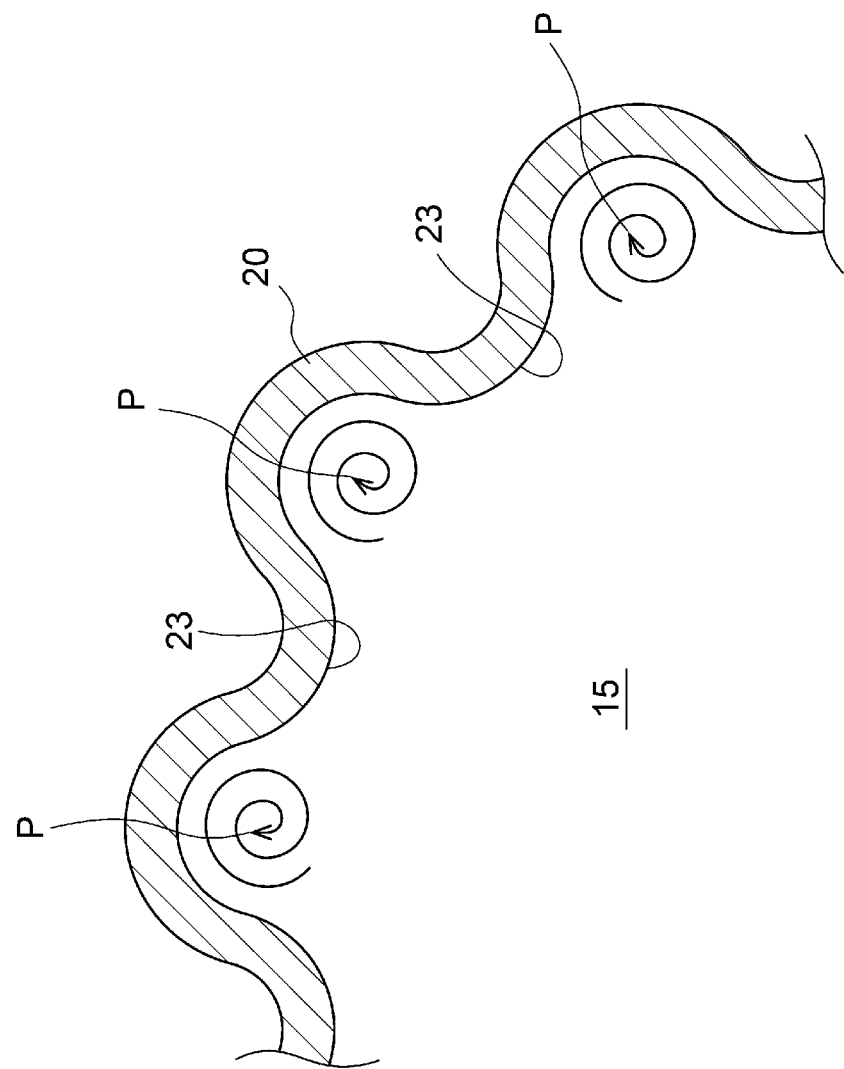
FIG. 7 is a view for describing the exhaust gas flow in a cross section taken along line VII-VII of FIG. 2.
Figure 8:
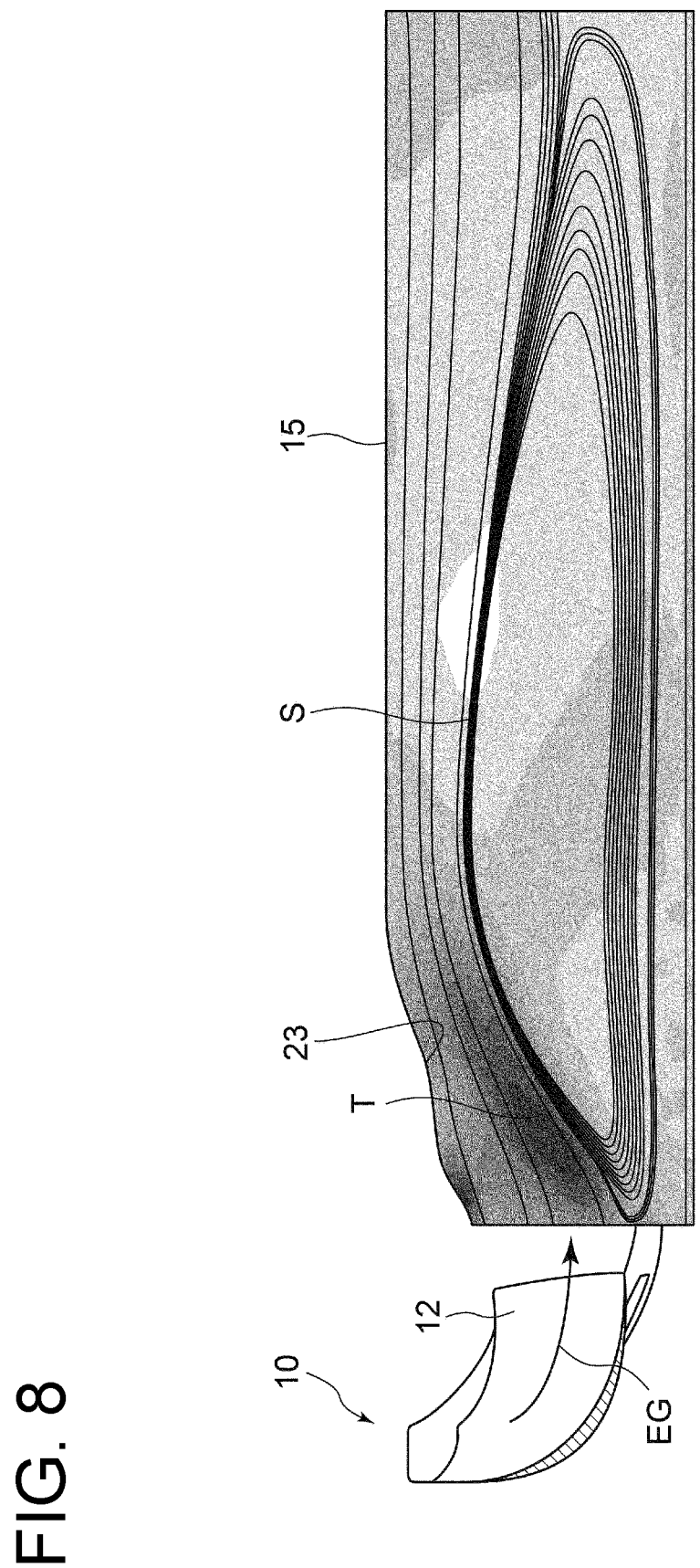
FIG. 8 is a view for describing the exhaust gas flow in the diffuser in the turbine according to an embodiment of the present disclosure.
Figure 9:
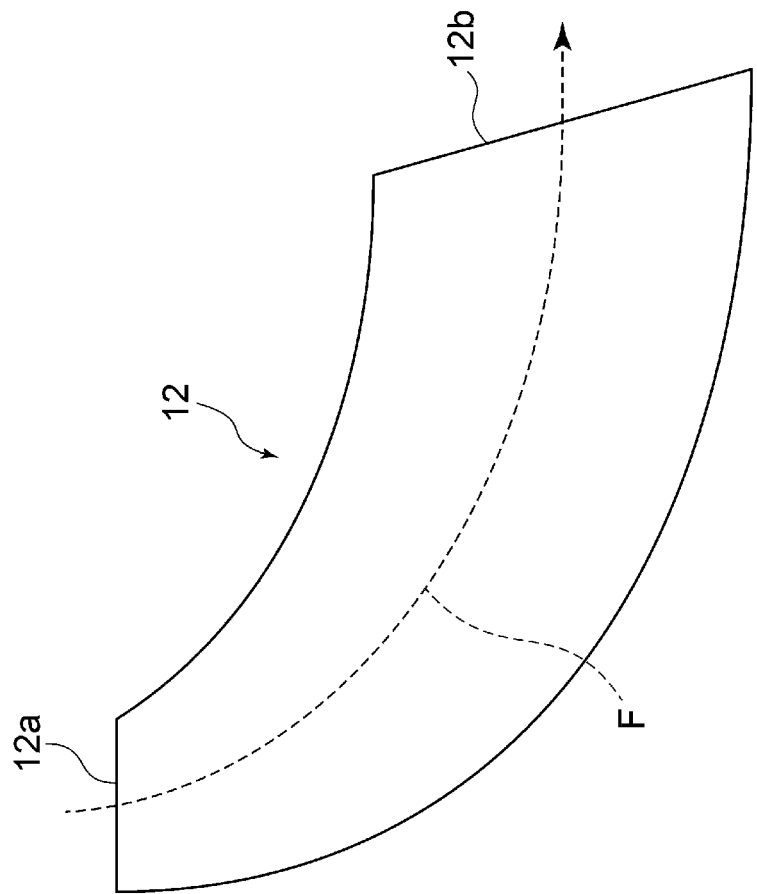
FIG. 9 is a view showing the exhaust gas flow between adjacent rotor blades in the turbine according to an embodiment of the present disclosure.

FIG. 6 depicts shade (color becomes darker as the flow velocity increases) representing a flow velocity distribution of the exhaust gas and streamline of the exhaust gas in a diffuser 15' of the conventional configuration (without the projection 23). In the diffuser 15' of the conventional configuration, since the exhaust gas flow EG having passed through the rotor blade 12 usually includes a swirling flow, the exhaust gas flow EG gets closer to a shroud side and a backflow vortex S is generated on the radially inner side of an exhaust gas flow T close to the shroud side. In the turbine 3, as shown in FIG. 7, since the plurality of projections 23 projecting radially inward of the tubular member 20 are formed, flow separation P is caused between the adjacent projections 23. With the separation P, as shown in FIG. 8 (the flow velocity distribution and the streamline of the exhaust gas are the same as in FIG. 6), the exhaust gas flow T close to the shroud side shifts radially inward as a whole. By being attracted to such exhaust gas flow in the diffuser 15, as shown in FIG. 9, of the exhaust gas flow between the adjacent rotor blades 12, a flow F near the center in a spanwise direction of the rotor blade 12 increases in flow velocity. Then, the flow velocity difference of a fluid between the inlet and the outlet of the rotor blade 12 increases, that is, the static pressure difference between the inlet and the outlet of the rotor blade 12 increases, and the torque applied to the blade surface of the rotor blade 12 increases, making it possible to improve performance of the turbine 3.

The exhaust gas flow at the outlet of the rotor blade 12 usually has a flow velocity distribution in which the flow velocity decreases radially inward from the shroud side. Such non-uniformity of the flow velocity in the radial direction becomes a loss, deteriorating the performance of the turbine 3. By contrast, in the turbine 3 shown in FIG. 2, since the exhaust gas flowing out of the rotor blade 12 flows in the tapered portion 24, it is possible to suppress the increase in flow velocity of the exhaust gas on the shroud side at the outlet of the rotor blade 12. Thus, the non-uniformity of the flow velocity in the radial direction is suppressed, making it possible to suppress the deterioration in performance of the turbine 3.

In the case where the tubular member 20 includes the tapered portion 24, if the surface 23c of the projection 23 is located on the inner side of the inner surface 24c at the outlet 24b of the tapered portion 24 in the radial direction of the tubular member 20, a part of the fluid flowing in the diffuser 15 is directed radially inward by the projection 23. Then, the effect of increasing the flow velocity of the flow near the center in the spanwise direction of the rotor blade 12 is reduced by interference with the exhaust gas flow (the flow T in FIG. 8) shifted radially inward described above. By contrast, in the turbine 3, since the projection 23 is configured such that the surface 23c of the projection 23 is located at the same position as the inner surface 24c at the outlet 24b of the tapered portion 24 or located on the outer side of the inner surface 24c at the outlet 24b of the tapered portion 24 in the radial direction of the tubular member 20, it is possible to suppress the reduction in the above-described effect.

Since the turbine 3 has the above-described configuration (see FIG. 5), that is, the configuration where $L_0 \leq L_1 \leq 1.1 L_0$ and $1.1 L_1 \leq L_2 \leq 1.5 L_1$ are satisfied, it is possible to enhance the above-described technical effect.

As shown in FIGS. 2 and 3, in the case where the projection 23 is configured such that the first end 23a and the second end 23b are at the same position in the circumferential direction of the inner surface 20a, if the exhaust gas having passed through the rotor blade 12 does not include the swirling flow, the projection 23 is less likely to be a bottleneck to the flow of the exhaust gas flowing on the shroud side, allowing the exhaust gas having passed through the rotor blade 12 to smoothly flow through the diffuser 15. As a result, it is possible to improve the performance of the turbine 3.

However, normally, the exhaust gas having passed through the rotor blade 12 includes the swirling flow. The exhaust gas having passed through the rotor blade 12 includes a swirling flow along the rotational direction A of the impeller 10 (see FIG. 2) on the high flow rate side, and includes a swirling flow along a direction opposite to the rotational direction A of the impeller 10 on the low flow rate side. As shown in FIG. 4, if the projection 23 is configured such that the second end 23b is located on the rotational direction A side of the impeller 10 relative to the first end 23a in the circumferential direction of the inner surface 20a, the projection 23 extends so as to twist with respect to the rotational axis RA along the rotational direction A of the impeller 10. Thus, the swirling flow along the rotational direction A of the impeller 10 can flow along between the adjacent projections 23 on the high flow rate side, allowing the fluid that has passed through the rotor blade 12 to smoothly flow through the diffuser 15. As a result, it is possible to improve the performance of the turbine 3 on the high flow rate side.

On the other hand, if the projection 23 is configured such that the first end 23a is located on the rotational direction A side of the impeller 10 relative to the second end 23b in the circumferential direction of the inner surface 20a, the projection 23 extends so as to twist with respect to the rotational axis RA along the direction opposite to the rotational direction A of the impeller 10. Thus, the swirling flow along the direction opposite to the rotational direction A of the impeller 10 can flow along between the adjacent projections 23 on the low flow rate side, allowing the fluid that has passed through the rotor blade 12 to smoothly flow through the diffuser 15. As a result, it is possible to improve the performance of the turbine 3 on the low flow rate side.

In the above-described embodiment, the turbine 3 of the turbocharger 1 has been described. However, the configuration of the above-described embodiment is also applicable to a turbine other than the turbocharger, and in that case, the fluid flowing into the turbine is not necessarily the exhaust gas but will be a fluid according to the configuration of the turbine.

The contents described in the above embodiments would be understood as follows, for instance.

[1] A turbine according to one aspect includes: a rotatable impeller (10) with a hub (11) provided with a plurality of rotor blades (12); and a tubular member (20) in which a diffuser (15) located downstream of the impeller (10) is formed. On an inner surface (20a) of the tubular member (20), a plurality of projections (23) projecting radially inward of the tubular member (20) are formed at positions closer to an inlet end (21) of the tubular member (20) than an outlet end (22) of the tubular member (20). The plurality of projections (23) are arranged in a circumferential direction of the inner surface (20a) so as to leave a space between adjacent projections (23).

Since a fluid having passed through the rotor blade usually includes a swirling flow, a fluid flow moves toward a shroud side, and a backflow vortex is generated radially inward thereof. By contrast, with the turbine of the present disclosure, since the plurality of projections projecting radially inward of the tubular member are formed, flow separation is caused between the adjacent projections, and with the separation, the fluid flow close to the shroud side shifts radially inward as a whole. By being attracted to such fluid flow in the diffuser, of the flow between the adjacent rotor blades, a flow near the center in a spanwise direction of the rotor blade increases in flow velocity. Then, the flow velocity difference of a fluid between the inlet and the outlet of the rotor blade increases, that is, the static pressure difference between the inlet and the outlet of the rotor blade increases, and the torque applied to the blade surface of the rotor blade increases, making it possible to improve performance of the turbine.

[2] A turbine according to another aspect is the turbine as defined in [1], where the tubular member (20) includes a tapered portion (24) whose inner diameter increases from the inlet end (21) toward the outlet end (22), between the inlet end (21) and the plurality of projections (23).

The fluid flow at the outlet of the rotor blade usually has a flow velocity distribution in which the flow velocity decreases radially inward from the shroud side. Such non-uniformity of the flow velocity in the radial direction becomes a loss, deteriorating the performance of the turbine. By contrast, with the above configuration [2], since the fluid flowing out of the rotor blade flows in the tapered portion, it is possible to suppress the increase in flow velocity of the fluid on the shroud side at the outlet of the rotor blade. Thus, the non-uniformity of the flow velocity in the radial direction is suppressed, making it possible to suppress the deterioration in performance of the turbine.

[3] A turbine according to still another aspect is the turbine as defined in [2], where the plurality of projections (23) each have a surface (23c) which is located at a same position as an inner surface (24c) at an outlet (24b) of the tapered portion (24) or located on an outer side of the inner surface (24c) at the outlet (24b) of the tapered portion (24) in a radial direction of the tubular member (20).

If the surface of each of the plurality of projections is located on the inner side of the inner surface at the outlet of the tapered portion in the radial direction of the tubular member, a part of the fluid flowing in the diffuser is directed radially inward by the projection. Then, the technical effect obtained from the above configuration [1] is reduced by interference with the fluid flow shifted radially inward by the above configuration [1]. By contrast, with the above configuration [3], it is possible to suppress the reduction in the technical effect obtained from the above configuration [1].

[4] A turbine according to yet another aspect is the turbine as defined in [2] or [3], where $L_0 \leq L_1 \leq 1.1 L_0$ and $1.1 L_1 \leq L_2 \leq 1.5 L_1$ are satisfied, where $L_0$ is a distance from a leading edge (12a) to a trailing edge (12b) of each of the plurality of rotor blades (12) in a rotational axis (RA) direction of the impeller 10 on a hub-side edge (12c) at which each of the plurality of rotor blades (12) is connected to the hub (11), and $L_1$ and $L_2$ are distances from the leading edge (12a) to an inlet (24a) and an outlet (24b) of the tapered portion (24), respectively, in the rotational axis (RA) direction on the hub-side edge (12c) of each of the plurality of rotor blades (12).

With such configuration, it is possible to enhance the technical effect obtained from the above configuration [2].

[5] A turbine according to yet another aspect is the turbine as defined in any one of [1] to [4], where each of the plurality of projections (23) includes a first end (23a) on a side of the inlet end (21) and a second end (23b) on a side of the outlet end (22), and has a shape extending from the first end (23a) to the second end (23b), and the first end (23a) and the second end (23b) are at a same position in the circumferential direction of the inner surface (20a).

With such configuration, if the fluid having passed through the rotor blade does not include the swirling flow, the projection is less likely to be a bottleneck to the flow of the fluid flowing on the shroud side, allowing the fluid having passed through the rotor blade to smoothly flow through the diffuser. As a result, it is possible to improve the performance of the turbine.

[6] A turbine according to yet another aspect is the turbine as defined in any one of [1] to [4], where each of the plurality of projections (23) includes a first end (23a) on a side of the inlet end (21) and a second end (23b) on a side of the outlet end (22), and has a shape extending from the first end (23a) to the second end (23b), and the second end (23b) is located on a rotational direction (A) side of the impeller (10) relative to the first end (23a) in the circumferential direction of the inner surface (20a).

On the high flow rate side, the fluid having passed through the rotor blade includes the swirling flow along the rotational direction of the impeller. With the above configuration [6], the projection extends so as to twist with respect to the rotational axis along the rotational direction of the impeller. Thus, the swirling flow along the rotational direction of the impeller can flow along between the adjacent projections, allowing the fluid that has passed through the rotor blade to smoothly flow through the diffuser. As a result, it is possible to improve the performance of the turbine on the high flow rate side.

[7] A turbine according to yet another aspect is the turbine as defined in any one of [1] to [4], where each of the plurality of projections (23) includes a first end (23a) on a side of the inlet end (21) and a second end (23b) on a side of the outlet end (22), and has a shape extending from the first end (23a) to the second end (23b), and the first end (23a) is located on a rotational direction (A) side of the impeller (10) relative to the second end (23b) in the circumferential direction of the inner surface (20a).

On the low flow rate side, the fluid having passed through the rotor blade includes the swirling flow along the direction opposite to the rotational direction of the impeller. With the above configuration [7], the projection extends so as to twist with respect to the rotational axis along the direction opposite to the rotational direction of the impeller. Thus, the swirling flow along the direction opposite to the rotational direction of the impeller can flow along between the adjacent projections, allowing the fluid that has passed through the rotor blade to smoothly flow through the diffuser. As a result, it is possible to improve the performance of the turbine on the low flow rate side.

[8] A turbocharger according to one aspect includes: the turbine (3) as defined in any one of [1] to [7].

According to the turbocharger of the present disclosure, comprising the turbine with the improved performance, it is possible to improve performance of the turbocharger.

Reference Signs List

1 Turbocharger
3 Turbine
10 Impeller
11 Hub
12 Rotor blade
12a Leading edge (of rotor blade)
12b Trailing edge (of rotor blade)
12c Hub-side edge (of rotor blade)
15 Diffuser
20 Tubular member
20a Inner surface (of tubular member)
21 Inlet end
22 Outlet end
23 Projection
23a First end (of projection)
23b Second end (of projection)
23c Surface (of projection)
24 Tapered portion
24a Inlet (of tapered portion)
24b Outlet (of tapered portion)
A Rotational direction (of impeller)
RA Rotational axis (of impeller)

The invention claimed is:

1. A turbine, comprising:
a rotatable impeller with a hub provided with a plurality of rotor blades; and
a tubular member in which a diffuser located downstream of the impeller is formed,
wherein, on an inner surface of the tubular member, a plurality of projections projecting radially inward of the tubular member are formed at positions closer to an inlet end of the tubular member than an outlet end of the tubular member,
wherein the plurality of projections are arranged in a circumferential direction of the inner surface so as to leave a space between adjacent projections, and
wherein the tubular member includes a tapered portion whose inner diameter increases from the inlet end toward the outlet end, between the inlet end and the plurality of projections.

2. The turbine according to claim 1,
wherein the plurality of projections each have a surface which is located at a same position as an inner surface at an outlet of the tapered portion or located on an outer side of the inner surface at the outlet of the tapered portion in a radial direction of the tubular member.

3. The turbine according to claim 1,
wherein $L_0 \leq L_1 \leq 1.1L_0$ and $1.1L_1 \leq L_2 \leq 1.5L_1$ are satisfied,
where $L_0$ is a distance from a leading edge to a trailing edge of each of the plurality of rotor blades in a rotational axis direction of the impeller on a hub-side edge at which each of the plurality of rotor blades is connected to the hub, and $L_1$ and $L_2$ are distances from the leading edge to an inlet and an outlet of the tapered portion, respectively, in the rotational axis direction on the hub-side edge of each of the plurality of rotor blades.

4. The turbine according to claim 1,
wherein each of the plurality of projections includes a first end on a side of the inlet end and a second end on a side of the outlet end, and has a shape extending from the first end to the second end, and
wherein the first end and the second end are at a same position in the circumferential direction of the inner surface.

5. The turbine according to claim 1,
wherein each of the plurality of projections includes a first end on a side of the inlet end and a second end on a side of the outlet end, and has a shape extending from the first end to the second end, and
wherein the second end is located on a rotational direction side of the impeller relative to the first end in the circumferential direction of the inner surface.

6. The turbine according to claim 1,
wherein each of the plurality of projections includes a first end on a side of the inlet end and a second end on a side of the outlet end, and has a shape extending from the first end to the second end, and
wherein the first end is located on a rotational direction side of the impeller relative to the second end in the circumferential direction of the inner surface.

7. A turbocharger, comprising:
the turbine according to claim 1.

\* \* \* \* \*